Nov. 22, 1966 L. A. POOLE 3,287,648

VARIABLE FREQUENCY DIVIDER EMPLOYING PLURAL BANKS OF COINCIDENCE CIRCUITS AND MULTIPOSITION SWITCHES TO EFFECT DESIRED DIVISION

Filed Jan. 21, 1964 3 Sheets-Sheet 1

INVENTOR.
LEWIS A. POOLE

BY Walter Foontz and Martin Finnegan
ATTORNEYS

VARIABLE FREQUENCY DIVIDER EMPLOYING PLURAL BANKS OF COINCIDENCE CIRCUITS AND MULTIPOSITION SWITCHES TO EFFECT DESIRED DIVISION

Filed Jan. 21, 1964 3 Sheets-Sheet 2

INVENTOR.
LEWIS A. POOLE
BY Wade Koontz and Martin P. Finnegan
ATTORNEYS

Nov. 22, 1966 L. A. POOLE 3,287,648

VARIABLE FREQUENCY DIVIDER EMPLOYING PLURAL BANKS OF COINCIDENCE CIRCUITS AND MULTIPOSITION SWITCHES TO EFFECT DESIRED DIVISION

Filed Jan. 21, 1964 3 Sheets-Sheet 3

INVENTOR.
LEWIS A. POOLE
BY Wade Koontz and Martin J. Finnegan
ATTORNEYS

United States Patent Office 3,287,648

Patented Nov. 22, 1966

3,287,648

VARIABLE FREQUENCY DIVIDER EMPLOYING PLURAL BANKS OF COINCIDENCE CIRCUITS AND MULTIPOSITION SWITCHES TO EFFECT DESIRED DIVISION

Lewis A. Poole, Fort Walton Beach, Fla., assignor to the United States of America as represented by the Secretary of the Air Force Filed Jan. 21, 1964, Ser. No. 339,312
1 Claim. (Cl. 328—48)

This invention relates to a variable frequency divider, and more particularly to an improved method of presetting a binary counter such that the number of pulses needed to fill the counter is a divisor of the input frequency.

Frequency dividers making use of binary counters are well known in computer technology. Many schemes are in existence to divide a signal frequency by a number not an integral power of two, such as the use of feedback from a particular stage to preceding stages of a binary chain of a counter to cause the counter to be advanced. Also in existence are various circuits for presetting a counter, and the use of specialized devices to obtain any desired count.

The invention consists of four main elements: (1) a binary counter made up of 10 flip-flops; (2) two banks of 2-input coincidence circuits; (3) two prewired jacks connected through switches to each bank of coincidence circuits and to specific stages of the counter; and, (4) a flip-flop, coincidence circuit, and driver, arranged to allow a predetermined pulse to pass through.

The coincidence circuit is enabled by a flip-flop when one more pulse than is needed to fill the counter is applied to the input; the next input pulse is allowed to pass through the coincidence circuit to become the output pulse of the divider.

The present invention is directed toward obtaining the advantages of using compatible elements of a computer system without the use of specialized circuitry or devices to obtain frequency division.

Accordingly, it is one object of the present invention to provide a frequency dividing system capable of producing frequency division with a minimum of equipment compatible with other elements of a computer system.

It is another object of this invention to provide a frequency divider which is stable, simple, reliable, and inexpensive.

It is a further object of the present invention to provide a novel and improved preset frequency divider which has a broad frequency range.

These and other objects of the present invention are achieved by utilizing a binary counter, a series of "and" circuits, and a series of prewired jacks. Input pulses having a frequency which is to be subdivided are applied to the binary counter and a disabled "and" circuit. When one more pulse than is needed to fill the counter is applied to the input, it passes through the counter and switches a flip-flop which enables an "and" gate. The succeeding pulse then passes through the "and" gate and is the output pulse. It also disables the "and" gate and passes through a series of "and" gates and prewired jacks to preset the binary counter to a desired count; the cycle of events is then repeated.

Accordingly,

Figure 1:
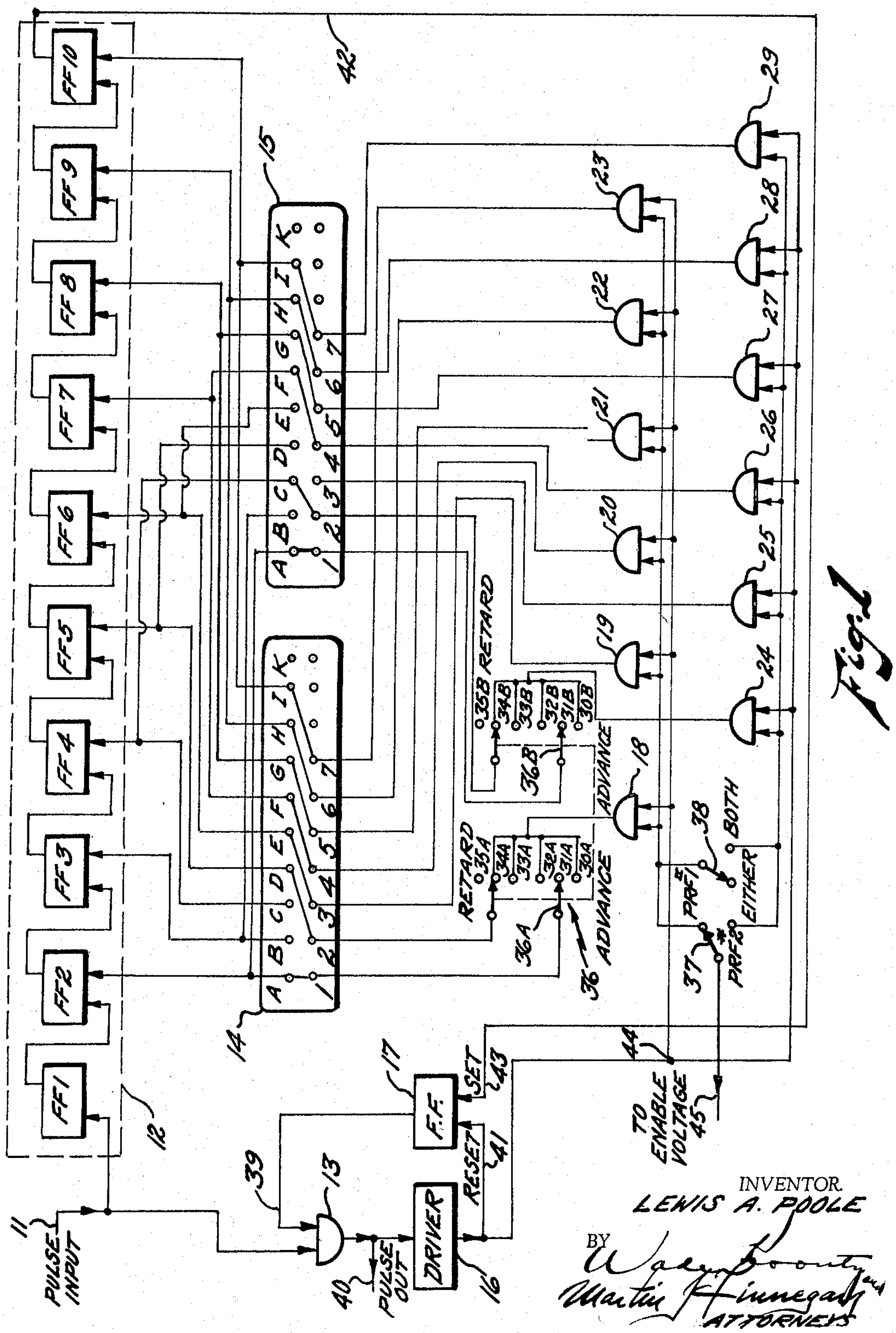
FIG. 1 is a schematic diagram in simplified block form, of a frequency dividing system embodying the invention.

FIGS. 3, 4, 5, and 6 are schematics showing various positions of the switches of FIG. 1 which illustrate the operation of the system.

Referring now to FIG. 1, signal pulses of the frequency to be subdivided are applied at input terminal 11 of the divider circuit. Terminal 11 is the input to a ten-stage binary counter 12, made up of 10 flip-flops, FF 1 to FF 10, which may be conventional types of bistable multivibrators of the Eccles-Jordan type. Terminal 11 is also one input of a two-input coincidence circuit 13; the other input 39 of this circuit receives the output of flip-flop 17. Output 40 of coincidence circuit 13 passes through driver 16 to reset side 41 of flip-flop 17; this is also the output pulse of the divider. Set side 43 of flip-flop 17 is connected to output 42 of binary counter 12. The output of driver 16 is also connected to the input of two banks of "and" gates, one bank made up of "and" gates 18 through 23, the other bank made up of "and" gates 24 through 29. Switches 37 and 38 determine the bank or banks of "and" gates which will provide an output to jacks 14 and 15. Jacks 14 and 15 are prewired to allow a preset of any combination of the last 9 stages of binary counter 12, terminals A through I of the jacks being wired to preset flip-flops 2 through 10 of counter 12 respectively. Ganged switch 36 determines which of the early stages of binary counter 12 are preset to slightly vary the output frequency.

Jacks 14 and 15 are prewired to allow pulses to pass through the jacks to preset the counter to count to any desired number. In FIG. 1, terminal 1 of jack 14 is wired to terminal A; terminals 2 to 7 are wired to terminals D to I respectively. As will be seen later, this will allow binary counter 12 to count to either 14, 16, or 30 depending on the setting of switch 36. On jack 15, terminal 1 is wired to terminal A, terminal 2 to terminal C, and terminals 4 through 7 are wired to terminals F to I respectively, thus allowing the binary counter to count to 54, 56, or 62, again depending on the setting of switch 36.

In the following description, switch 36 is set so that terminals 31 and 34 of the switch are connected to terminals 1 and 2 of jacks 14 and 15, as in FIG. 1. Switches 37 and 38 are set also as shown in FIG. 1 to give a single PRF #1.

A pulse input of the frequency to be divided is applied at terminal 11 of FIG. 1. The waveform of the pulse input is shown at A of FIG. 2. This pulse, applied to FF 1 of counter 12, will consecutively cycle FF 1 to produce the waveform at B of FIG. 2. The pulse input is also applied to "and" gate 13, the other input 39 of which is connected to FF 17; since at this time ($t_1$) FF 17 is in the low state, and since FF 17 must be in the high state for coincidence to occur and thus allow a gate output, there is no output from gate 13.

Figure 2:
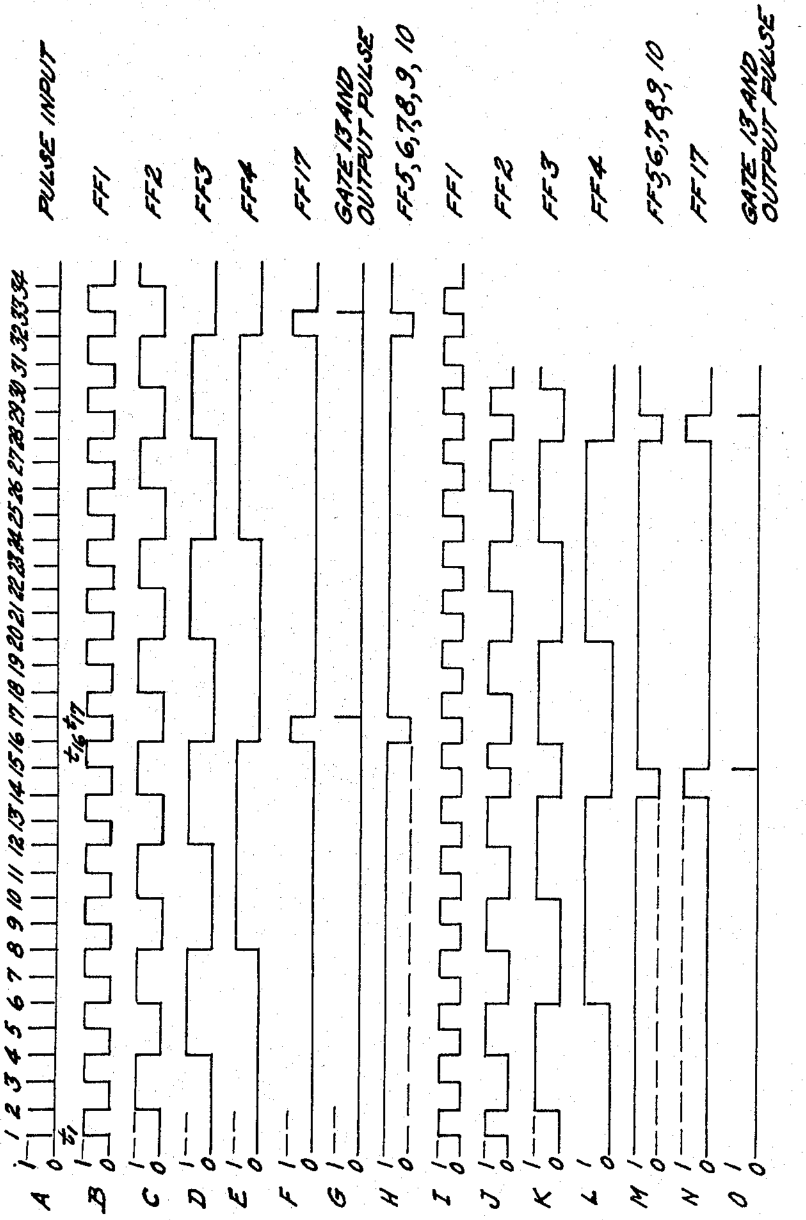
FIG. 2 shows the voltage waveforms at various points in the circuit of FIG. 1.

Each succeeding flip-flop of the binary counter will switch state upon the application of a trailing edge of the preceding stage; the waveforms of FF's 2, 3, and 4 are shown at C, D, and E of FIG. 2.

Initially at $t_1$, it is assumed that FF's 5 through 10 are in the "one" state, as shown in H of FIG. 2. Consequently, after the application of the 15th pulse, all stages of the counter are in the "one" state; the 16th pulse will then pass through the counter at time $t_{16}$ and will switch all 10 stages of the counter to zero; this pulse is applied to set side 43 of FF 17, causing FF 17 to switch to a high or "one" state, as shown in F of FIG. 2, and thus applying the high voltage of FF 17 to the "and" gate 13 input at line 39; the 17th pulse will then pass through "and" gate 13 at line 40, since at this time ($t_{17}$) there is coincidence; this pulse is the output pulse of the circuit, occurring at 1/16 the frequency of the input frequency, as shown at G of FIG. 2. This output pulse is also applied through driver 16 to reset side 41 of FF 17, thus switching FF 17 to the low or "zero" state, and thus preventing any further pulses from passing through "and" gate 13, until FF 17 is again switched to a high state in the next cycle.

The pulse output from the driver is also applied at terminal 44 to the banks of "and" gates 18 to 23, and 24 to 29. In FIG. 1, the position of switches 37 and 38 allows an external enable voltage 45 to be applied to "and" gates 18 to 23; gates 24 to 29 are disabled, and therefore can have no output; hence, an output pulse from driver 16 can pass through gates 18 to 23 but cannot pass through gates 24 to 29. The output pulse from gates 18 to 23 is applied to jack 14, which had been prewired to allow the pulse to pass through to set FF's 5 through 10 to the high state; this allows the 10 stage counter to act as a 4 stage counter, and, therefore, to count to 16.

Ganged switch 36 allows the output frequency to be varied by presetting an early stage of counter 12. The preceding description showed the switch in a position such that the pulse output of gate 18 passed through terminal 34A of switch 36 to terminal 2 of jack 14 to preset stage 5 of counter 12.

Figures 3, 4, 5, 6:
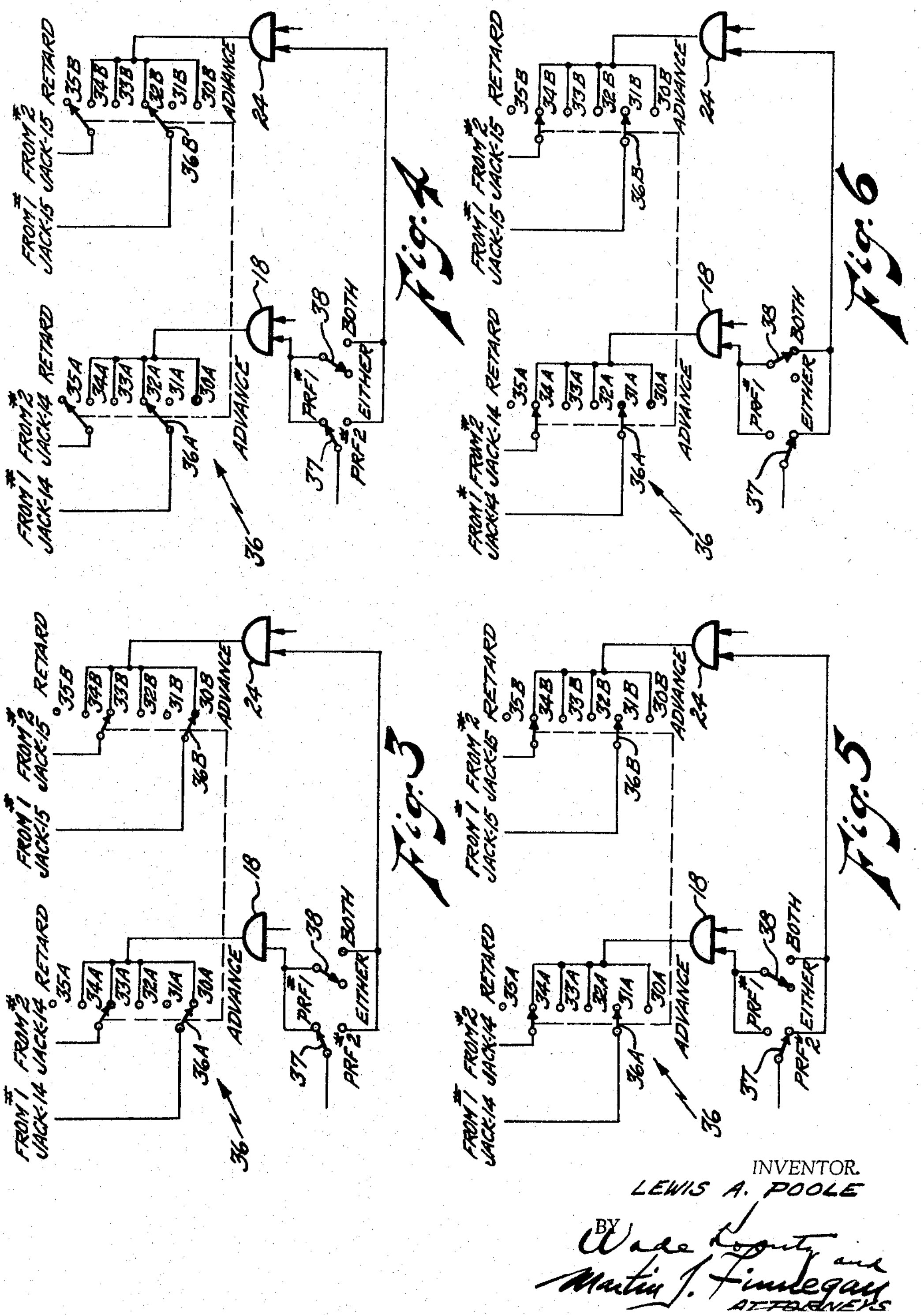

If switch 36 is rotated to the "advance" position so that terminals 33A and 30A are the output terminals, as in FIG. 3, and with switch 37 set in the "PRF #1" position, and switch 38 in the "either" position, counter 12 will then be preset to count to 14, since this setting of the switches will now allow FF 2 to be preset; the waveforms of the counter flip-flops, flip-flop 17, and gate 13 for this condition are shown in FIG. 2, I through O, which show that the frequency of the output pulse has now been advanced, the circuit now providing one output pulse for every 14 input pulses.

If ganged switch 36 is rotated to the "retard" position, as in FIG. 4, terminal 2 of jack 14 will be disconnected. This setting will allow the counter to count to 30, thus retarding the output frequency to provide one output pulse for every 30 input pulses.

If switch 37 is placed in to the PRF #2 position, and with switch 38 in the "either" position, as in FIG. 5, "and" gates 24 through 29 will be actuated; switch 36B is then used to preset counter 12 by the use of jack 15; rotating of switch 36B from "retard" to "mid-position" to "advance" will allow an output pulse for every 62, 56 and 54 input pulses respectively. The action of switch 36B is identical to that of switch 36A, except that now "and" gates 24 through 29, and jack 15 are used to preset counter 12.

If switch 38 is switched to the "both" position, as in FIG. 6, then "and" gates 18 to 23, and 24 to 29, as well as switches 36A and 36B and jacks 14 and 15 are used to preset the counter. This setting of switch 38 will allow one output pulse for each 6, 8, and 30 pulses at the input when switch 36 is rotated from the "advance" to the "mid-position" to the "retard" position respectively.

The use of switch 36 to change the output frequency by a slight amount is advantageous in certain radar applications when two ore more radars are tracking the same target to stop interaction from the other radar signals.

Switches 37 and 38 would also be of value in radar applications, since they allow a selection of either one or a combination of two predetermined pulse repetition frequencies (PRF) utilizing either gates 18 to 23, or 24 to 29, or both banks of gates, and thus allow radars equipped with this type of frequency divider unit to transfer from non-interference operation with one type of radar to non-interference operation with another type of radar.

What is claimed is:

A pulse signal frequency divider comprising:

(*a*) a counter including a plurality of connected in series bistable stages fed by the pulse signal;

(*b*) a first coincidence circuit fed by the pulse signal and the output of the last stage of the counter, the output of the first coincidence circuit being the desired division of the pulse signal frequency;

(*c*) an enabling voltage source;

(*d*) at least two banks of reset coincidence circuits fed by the enabling voltage source and the first coincidence circuit;

(*e*) a multi-position switch for selecting the banks of coincidence circuits;

(*f*) at least two prewired jacks having a plurality of input terminals and a plurality of output terminals at least equal to the number of counter stages, each of the banks of reset coincidence circuits connected with their outputs to a respective one of said two prewired jacks of the input terminals, each output terminal of the two prewired jacks being connected to at least two counter stages for resetting the counter;

(*g*) and an adjustable switch interposed between one of the reset coincidence circuits of each of the banks of reset coincidence circuits and the prewired jacks connecting selected input terminals of the prewired jacks.

References Cited by the Examiner

UNITED STATES PATENTS

| | | | |
|---|---|---|---|
| 2,536,917 | 1/1951 | Dickinson | 328—46 |
| 2,896,092 | 7/1959 | Pugsley | 328—39 X |
| 3,147,442 | 9/1964 | Fritzche et al. | 328—48 X |
| 3,212,010 | 10/1965 | Podlesny | 328—41 |

ARTHUR GAUSS, *Primary Examiner.*

H. HEYMAN, *Assistant Examiner.*